(12) United States Patent
Jeon et al.

(10) Patent No.: US 11,258,497 B2
(45) Date of Patent: Feb. 22, 2022

(54) BEAM TRANSMITTING DEVICE AND OPERATING METHOD OF THE SAME

(71) Applicant: SAMSUNG ELECTRONICS CO., LTD., Suwon-si (KR)

(72) Inventors: Eun Sung Jeon, Seoul (KR); Wook Bong Lee, San Jose, CA (US); Min Ki Ahn, Seoul (KR); Sung Soo Kim, Seoul (KR); Joon Suk Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/188,135

(22) Filed: Mar. 1, 2021

(65) Prior Publication Data
US 2021/0281303 A1    Sep. 9, 2021

(30) Foreign Application Priority Data

Mar. 3, 2020    (KR) .................. 10-2020-0026319

(51) Int. Cl.
*H04B 7/06*    (2006.01)

(52) U.S. Cl.
CPC ......... *H04B 7/0617* (2013.01); *H04B 7/0619* (2013.01)

(58) Field of Classification Search
CPC ... H04B 7/0617; H04B 7/0634; H04B 7/0619
See application file for complete search history.

(56) References Cited

U.S. PATENT DOCUMENTS

| | | | |
|---|---|---|---|
| 8,693,568 B2 | 4/2014 | Lee et al. | |
| 9,220,026 B2 | 12/2015 | Hasegawa | |
| 9,680,538 B2 | 6/2017 | Xia et al. | |
| 10,148,330 B2 | 12/2018 | Jiang et al. | |
| 2016/0142117 A1* | 5/2016 | Rahman | H04B 7/0469 375/267 |
| 2019/0260444 A1* | 8/2019 | Hauzner | H04B 7/0617 |

FOREIGN PATENT DOCUMENTS

| | | |
|---|---|---|
| JP | 2019-114878 A | 7/2019 |
| KR | 10-1460798 B1 | 11/2014 |

OTHER PUBLICATIONS

Yu Qiu et al. "Smoothed SVD-based Beamforming for FBMC/OQAM Systems Based on Frequency Spreading", arXiv:1806.06994v1 [eess.SP], Jun. 19, 2018, pp. 1-12 (12 pages total).

\* cited by examiner

*Primary Examiner* — Sung S Ahn
(74) *Attorney, Agent, or Firm* — Sughrue Mion, PLLC (57) ABSTRACT

A beam transmitting device improves performance of a communication channel. The beam transmitting device includes a controller configured to transmit a null data packet (NDP) and receive channel information; and a smoothing circuit configured to smooth a plurality of beamforming vectors in the channel information. The smoothing circuit includes a weight calculator configured to calculate a common phase factor using two adjacent beamforming vectors among the plurality of beamforming vectors, and a moving average filter configured to perform the smoothing using the common phase factor.

20 Claims, 9 Drawing Sheets

| Composite Name: | Short GI | Short GI NSYM Disambiguation | SU/Mu[0] Coding | LDPC Extra OFDM Symbol | SU VHT-MCS/MU[1-3] Coding | | | | Reserved | Reserved | CRC | Tail |
|---|---|---|---|---|---|---|---|---|---|---|---|---|
| SU Name: | | | | | SU VHT-MCS | | | | Beam-formed | | | |
| MU Name: | | | | | MU[1] Coding | MU[2] Coding | MU[3] Coding | Reserved | Beam-formed | | | |
| Bits: | 1 | 1 | 1 | 1 | 1 | 1 | 1 | 1 | 1 | 1 | 8 | 6 |
| | B0 | B1 | B2 | B3 | B4 | B5 | B6 | B7 | B8 | B9 | B10 B17 | B18 B23 |

FIG. 6

| Size of $V_K$ | Number of angles | Order of angles |
|---|---|---|
| 2×1 | 2 | $\phi_{11}, \psi_{21}$ |
| 2×2 | 2 | $\phi_{11}, \psi_{21}$ |
| 3×1 | 4 | $\phi_{11}, \phi_{21}, \psi_{21}, \psi_{31}$ |
| 3×2 | 6 | $\phi_{11}, \phi_{21}, \phi_{22}, \psi_{21}, \psi_{31}, \psi_{32}$ |
| 4×1 | 6 | $\phi_{11}, \phi_{21}, \phi_{31}, \psi_{21}, \psi_{31}, \psi_{41}$ |
| 4×2 | 10 | $\phi_{11}, \phi_{21}, \phi_{22}, \phi_{31}, \phi_{32}, \psi_{21}, \psi_{31}, \psi_{41}, \psi_{32}, \psi_{42}$ |

BEAM TRANSMITTING DEVICE AND OPERATING METHOD OF THE SAME

CROSS-REFERENCE TO THE RELATED APPLICATION

This application is based on and claims priority from Korean Patent Application No. 10-2020-0026319 filed on Mar. 3, 2020 in the Korean Intellectual Property Office, and all the benefits accruing therefrom under 35 U.S.C. 119, the contents of which in its entirety are herein incorporated by reference.

BACKGROUND

1. Field

The present disclosure relates to a beam transmitting device and an operating method of the same.

2. Description of the Related Art

In a communication environment using multiple transmit antennas and multiple receive antennas, a beamforming process may be used to improve performance of the communication environment. The beamforming process may include adjusting gains of antennas, direction/range of a beam, and the like based on quality of a communication channel established between a beam transmitting device and a beam receiving device.

In order to adjust the gains of antennas and the direction/range of a beam, beamforming information including a beamforming matrix is required. However, when the beamforming information is not properly generated, the performance of the communication channel may be deteriorated or an effect of beamforming technology may not be obtained sufficiently.

SUMMARY

Aspects of the present disclosure provide a beam transmitting device capable of improving performance of a communication channel.

Aspects of the present disclosure also provide an operating method of a beam transmitting device capable of improving performance of a communication channel.

Provided herein is a beam transmitting device comprising: a controller configured to: transmit a null data packet (NDP), and receive channel information; and a smoothing circuit configured to smooth a plurality of beamforming vectors in the channel information, wherein the smoothing circuit comprises: a weight calculator configured to calculate a common phase factor using two adjacent beamforming vectors among the plurality of beamforming vectors, and a moving average filter configured to perform the smoothing using the common phase factor, wherein the controller is further configured to transmit a waveform based on the plurality of beamforming vectors, a preamble and data.

Also provided herein is an operating method of a beam transmitting device, the operating method comprising: transmitting, by the beam transmitting device, a null data packet; receiving, by the beam transmitting device, channel information, wherein the channel information is sent by a beam receiving device after a reception of the null data packet; obtaining, based on an interpolation of the channel information, a plurality of beamforming vectors; calculating, by a weight calculator, a common phase factor using the plurality of beamforming vectors; obtaining a weighted plurality of beamforming vectors by the weight calculator and based on the common phase factor applied to the plurality of beamforming vectors; calculating, by a moving average filter, a moving average of the weighted plurality of beamforming vectors to perform smoothing on the beamforming vectors; and transmitting a waveform based on the plurality of beamforming vectors, a preamble and data.

Also provided herein is a beam transmitting device comprising: a beamformer configured to form a beam; a transmitter configured to transmit, using the beam, a null data packet; a controller configured to control a preamble in the null data packet; an interpolator configured to: interpolate channel information, wherein the channel information is sent by a beam receiving device after a reception of the null data packet, and obtain, based on the interpolated channel information, a plurality of beamforming vectors; and a smoothing circuit configured to smooth the plurality of beamforming, wherein the smoothing circuit includes: a weight calculator configured to obtain a weighted plurality of beamforming vectors based on a common phase factor; a comparator configured to compare a value with a threshold to determine whether to perform smoothing, the value derived using two adjacent beamforming vectors among the plurality of beamforming vectors; and a moving average filter configured to smooth by forming a moving average using the common phase factor based on an output of the comparator.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The embodiments described herebelow are all example embodiments, and thus, the inventive concept is not limited to these embodiments disclosed below and may be realized in various other forms. Each of the embodiments provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

Figure 1:
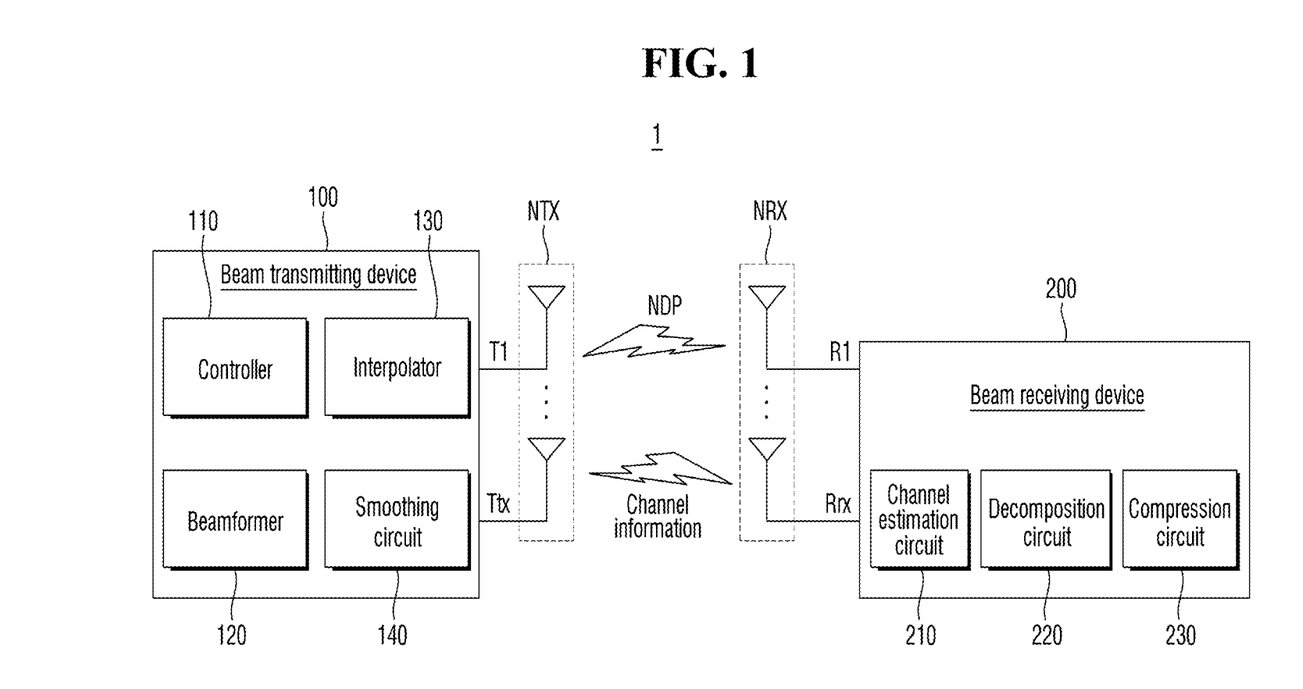
FIG. 1 is a block diagram exemplarily showing a beam transmission system 1 including a beam transmitting device according to some embodiments.

FIG. 1 is a block diagram exemplarily showing a beam transmission system 1 including a beam transmitting device according to some embodiments.

Referring to FIG. 1, the beam transmission system according to some embodiments includes a beam transmitting device 100 and a beam receiving device 200.

The beam transmitting device 100 and the beam receiving device 200 may exchange information with each other through a channel. The information may include, for example, a null data packet NDP and/or channel information.

The beam transmission system may be referred to as a multi-input multi-output (MIMO) system. The beam transmission system may be, as a non-limiting example, a long term evolution (LTE) system, a code division multiple access (CDMA) system, a global system for mobile communications (GSM) system, a wireless local area network (WLAN) system, or any other beam transmission system. The beam transmission system may include tx transmit antennas NTX and rx receive antennas NRX.

The beam receiving device 200 may be referred to as various devices that can communicate with the beam transmitting device 100 to transmit and receive data packets (or null data packets) and/or channel information. For example, the beam receiving device 200 may be referred to as a user equipment (UE), a mobile station (MS), a mobile terminal (MT), a user terminal (UT), a subscriber station (SS), or a mobile device. The beam transmitting device 100 may be a fixed station communicating with the beam receiving device 200 and/or another beam transmitting device 100. The beam transmitting device 100 may communicate with the beam receiving device 200 and/or another beam transmitting device 100 to transmit and receive data packets (or null data packets) and/or channel information. For example, the beam transmitting device 100 may be referred to as a node B, an evolved-node B (eNB), a base transceiver system (BTS), a station (STA), or an access point (AP).

A wireless communication network between the beam receiving device 200 and the beam transmitting device 100 may support communication of multiple users by sharing available network resources. For example, in the wireless communication network, information may be delivered in various ways such as code division multiple access (CDMA), frequency division multiple access (FDMA), time division multiple access (TDMA), orthogonal frequency division multiple access (OFDMA), and single carrier frequency division multiple access (SC-FDMA).

The beam receiving device 200 will be described first. The beam receiving device 200 may include a plurality of receive antennas NRX, a channel estimation circuit 210, a decomposition circuit 220, and a compression circuit 230. The components included in the beam receiving device 200 are not limited thereto, and each component may be a hardware block including an analog circuit and/or a digital circuit, or may be a software block including a plurality of instructions executed by a processor or the like.

The beam receiving device 200 may receive a signal (e.g., a downlink signal and/or a null data packet NDP) from the beam transmitting device 100 through the plurality of receive antennas NRX. The received signal may be an RF signal. Although not shown, the beam receiving device 200 may include an RF circuit. The RF circuit may include an analog down-conversion mixer, and may down-convert a frequency of the received signal using the analog down-conversion mixer to generate a baseband signal.

The channel estimation circuit 210 may estimate a state of a channel using a reference signal included in the signal received from the beam transmitting device 100. In one of several embodiments, the received signal used for channel estimation may be referred to as a sounding packet or a null data packet NDP. The signal $y_k$ received by the channel estimation circuit 210 for channel estimation from the beam transmitting device 100 may be expressed by Eq. 1:

$$y_k = H_k x_k + n_k \qquad \text{Eq. 1}$$

In Eq. 1, $H_k$ represents a channel matrix, $x_k$ represents a transmission data stream, and $n_k$ represents a thermal noise. A size of $H_k$ may be Nrx×Ntx. Here, Nrx is the number of receive antennas NRX, and Ntx is the number of transmit antennas NTX. Each element of Eq. 1 may be a vector or a matrix. For $H_k$ of dimension $N_{rx}$ by $N_{tx}$ in Eq. 1, $y_k$ is $N_{rx}$ by 1, $x_k$ is $N_{tx}$ by 1, $x_k$ is $N_{tx}$ by 1 and $n_k$ is $N_{rx}$ by 1. In general all the variables may be complex or may be written in all real form with increased dimensions.

The transmission data stream $x_k$ may have a size of, for example, Nss×1. Here, Nss is the number of transmission streams. In this case, $H_k$ includes a mapping from transmit streams to transmit antennas. In general the number of transmit streams may be less than or equal to the number of transmit antennas.

The thermal noise $n_k$ may be a white Gaussian noise. In addition, k is a subcarrier index, and k may have a range of 1 to $N_{FFT}$. The thermal noise $n_k$ may have a size of Nrx×1. Thus, Eq. 1 is applicable for each subcarrier k considered alone.

The channel estimation circuit 210 may generate channel state information based on information on the estimated channel. The channel state information may include at least one of a channel quality indicator (CQI), a precoding matrix indicator (PMI), and a rank indicator (RI). The channel state information $\hat{H}_{est,k}$ estimated and generated by the channel estimation circuit 210 may be expressed by Eq. 2:

$$\hat{H}_{est,k} = H_k + e_k \qquad \text{Eq. 2}$$

In Eq. 2, $e_k$ is a noise corresponding to an estimation error that occurs while the channel estimation circuit 210 estimates the signal received from the beam transmitting device 100. In a low signal to noise ratio (SNR) region, the estimation error $e_k$ has a high value, so that a receiving performance of the beam receiving device 200 may be reduced. Accordingly, in order to reduce the estimation error $e_k$, the beam receiving device 200 may perform a smoothing operation. The smoothing operation of the beam receiving device 200 will be described later with reference to FIGS. 2 and 3.

The decomposition circuit 220 performs a singular value decomposition (SVD) for a channel matrix $H_k$ of the channel state information $\hat{H}_{est,k}$ estimated by the channel estimation circuit 210 to obtain Eq. 3:

$$H_k = U_k \Sigma_k V_k^h \qquad \text{Eq. 3}$$

In Eq. 3, $U_K$ is a left singular matrix, and $V_k$ is a right singular matrix, and may be Hermitian. A matrix "B" is Hermitian if the transpose and complex conjugate of B is B itself. $\Sigma_k$ may be a diagonal matrix including non-negative singular values.

A size of the left singular matrix $U_K$ may be Nrx×Nss. A size of the right singular matrix $V_k$ may be Ntx×Nss. A size of $\Sigma_k$ may be Nss×Nss. The right singular matrix $V_k$ may be referred to as a beamforming vector formed in the beam transmitting device 100.

In the beam transmission system (e.g., an IEEE 802.11n/ac/ax WLAN system) including the beam transmitting device 100 according to some embodiments, the beam transmitting device 100 transmits a signal to the beam receiving device 200 through an orthogonal frequency division multiplexing (OFDM) modulation in which orthogonality of $N_{FFT}$ subcarriers within one symbol is guaranteed. Therefore, the channel estimation operation of the channel estimation circuit 210 and the singular value decomposition operation of the decomposition circuit 220 may be performed for each subcarrier.

The compression circuit 230 may apply a Givens rotation matrix to the beamforming vector $V_k$ generated by the decomposition circuit 220 according to the WLAN standard. Generally, a Givens rotation is a rotation in a plane spanned by two coordinate axes. The compression circuit 230 may convert the beamforming vector $V_k$ having a size of Ntx× Nss, which includes complex numbers, into an angle corresponding to a phase and magnitude of the complex number by applying the Givens rotation matrix to the beamforming vector $V_k$. The above-described angles may be quantized according to the number of bits determined in the system standard (e.g., IEEE 802.11ac, IEEE 802.11ax, or IEEE 802.11n) and then transmitted to the beam transmitting device 100 as channel information.

In this case, in the system standard (e.g., IEEE 802.11ac, IEEE 802.11ax, or IEEE 802.11n), in order to reduce overhead transmitted to the beam transmitting device 100, the channel information for all subcarriers is not provided to the beam transmitting device 100. That is, the beam receiving device 200 may transmit channel information for only a specific subcarrier to the beam transmitting device 100.

For example, when the number of subcarriers grouped is 1 ($N_g=1$), channel information for all subcarriers is transmitted from the beam receiving device 200 to the beam transmitting device 100. In each of the cases where the number of subcarriers grouped is 2 ($N_g=2$), the number of subcarriers grouped is 4 ($N_g=4$), and the number of subcarriers grouped is 16 ($N_g=16$), channel information for only one representative subcarrier in a group formed by 2, 4, or 16 subcarriers among all subcarriers may be transmitted from the beam receiving device 200 to the beam transmitting device 100.

As in the above example, in the compression circuit 230, when the number of subcarriers grouped is 2 ($N_g=2$), when the number of subcarriers grouped is 4 ($N_g=4$), and when the number of subcarriers grouped is 16 ($N_g=16$), channel information for only some subcarriers is transmitted from the beam receiving device 200 to the beam transmitting device 100. Therefore, in order to generate smoothed beamforming vectors for all subcarriers, the beam transmitting device 100 may infer channel information for subcarriers that have not been received, using an interpolation method of an interpolator 130 (to be described later) of the beam transmitting device 100.

The beam receiving device 200 may smooth the channel state information $\hat{H}_{est,k}$ estimated by the channel estimation circuit 210 by using a smoothing filter (not shown) in the beam receiving device 200. That is, the beam receiving device 200 may remove the estimation error $e_k$ included in the channel state information $\hat{H}_{est,k}$ through the smoothing filter.

This will be described in detail with reference to FIGS. 2 and 3.

Figure 2:
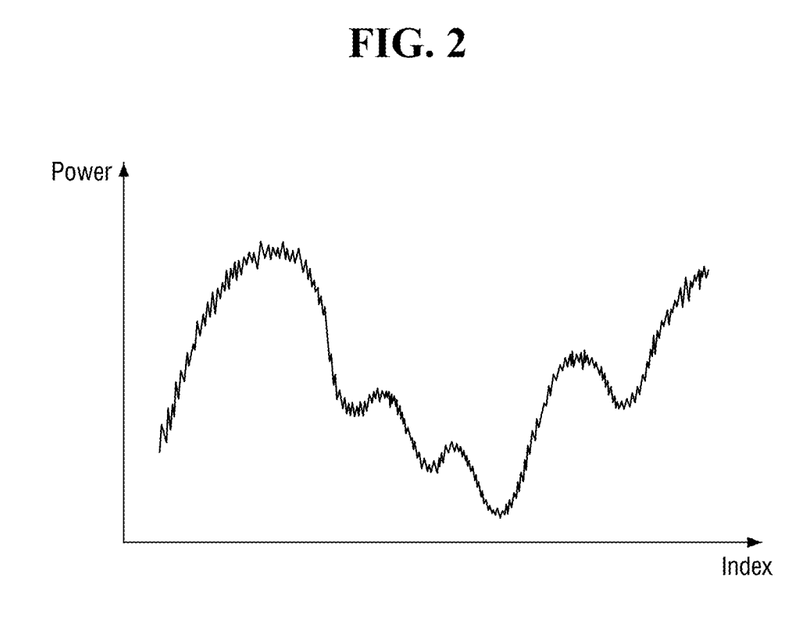
FIG. 2 is a graph exemplarily showing a data packet transmitted by the beam transmitting device.

FIG. 2 is a graph exemplarily showing a data packet transmitted by the beam transmitting device. FIG. 3 is a graph exemplarily showing smoothed data of the data packet received from the beam transmitting device.

FIG. 2 exemplarily shows a power depending on a frequency of the channel state information $\hat{H}_{est,k}$ received from the beam transmitting device 100 before the beam receiving device 200 performs smoothing. The horizontal axis of the graph of FIG. 2 may correspond to an index of subcarriers classified depending on the frequency of the channel state information $\hat{H}_{est,k}$. The channel state information $\hat{H}_{est,k}$ may have a different power in each of the subcarriers.

Figure 3:
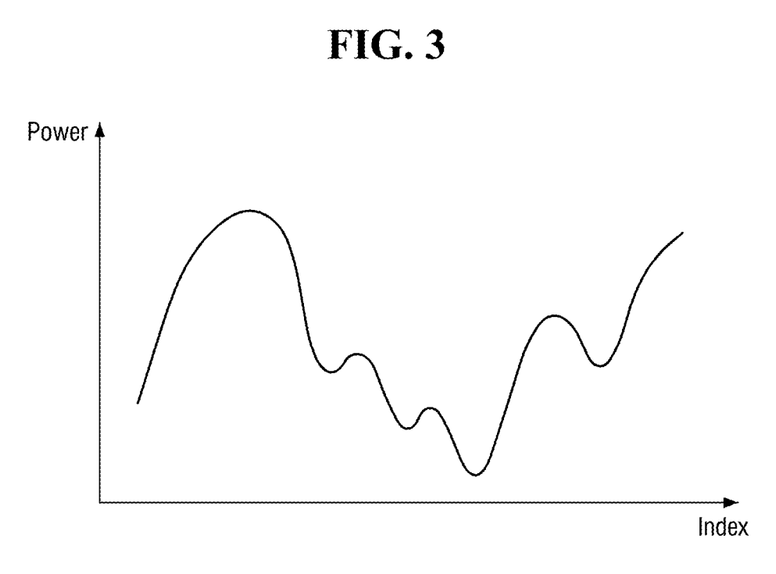
FIG. 3 is a graph exemplarily showing smoothed data of the data packet received from the beam transmitting device.

FIG. 3 is an example showing the power depending on the frequency of the channel state information $\hat{H}_{est,k}$ after the beam receiving device 200 performs smoothing on the channel state information $\hat{H}_{est,k}$. As described above, the beam receiving device 200 performs smoothing on the channel state information $\hat{H}_{est,k}$ to reduce the estimation error $e_k$ included in the channel state information $\hat{H}_{est,k}$. By reducing the estimation error $e_k$ included in the channel state information $\hat{H}_{est,k}$, the power depending on the frequency of the channel state information $\hat{H}_{est,k}$ may be more accurately expressed.

However, the beamforming vector $V_k$ formed by performing beamforming on the data packet in the beam transmitting device 100 may introduce waveform attributes difficult to demodulate due to variations in channel power over frequency (for example, due to multipath fading). This aspect of the beamforming vector is referred to herein as a discontinuity. Therefore, when the beam receiving device 200 applies smoothing to the channel state information $\hat{H}_{est,k}$ including the beamforming vector $V_k$ having discontinuity, the beam receiving device 200 may not be able to correctly recover data $x_k$ transmitted from the beam transmitting device 100. That is, reliability of the smoothing operation performed by the beam receiving device 200 may be lowered due to the beamforming vector $V_k$ having discontinuity formed by the beam transmitting device 100.

Accordingly, the beam transmitting device 100 according to some embodiments may receive, from the beam receiving device 200, the channel information represented as phases and angles that are quantized according to the number of bits determined in the communication standard (e.g., IEEE 802.11n/ac/ax) through the compression circuit 230 of the beam receiving device 200. At this time, the beam receiving device 200 may generate the channel information using a null data packet NDP transmitted by the beam transmitting device 100. Thereafter, the beam transmitting device 100 may use the channel information received from the beam receiving device 200 to smooth the beamforming vector $V_k$, thereby removing discontinuity in the beamforming vector $V_k$. Through this process, in the beam transmission system including the beam transmitting device 100 according to some embodiments, a data packet including the beamforming vector formed in the beam transmitting device 100 is transmitted to the beam receiving device 200, and the beam receiving device 200 performs a smoothing operation on the data packet including the beamforming vector $V_k$, thereby more accurately recovering data received from the beam transmitting device 100.

This will be described in detail again with reference to the beam transmitting device 100 of FIG. 1.

Referring back to FIG. 1, the beam transmitting device 100 includes a plurality of transmit antennas NTX, a controller 110, a beamformer 120, an interpolator 130, and a smoothing circuit 140.

The beam transmitting device 100 according to some embodiments may receive channel information from the beam receiving device 200 through the plurality of transmit antennas NTX.

The controller 110 may transmit a data packet or a null data packet NDP to the beam receiving device 200, receive channel information from the plurality of transmit antennas NTX, and control a preamble of the data packet or the null data packet NDP.

Hereinafter, an operation of the controller 110 controlling the preamble will be exemplarily described with reference to FIGS. 4 and 5.

Figure 4:
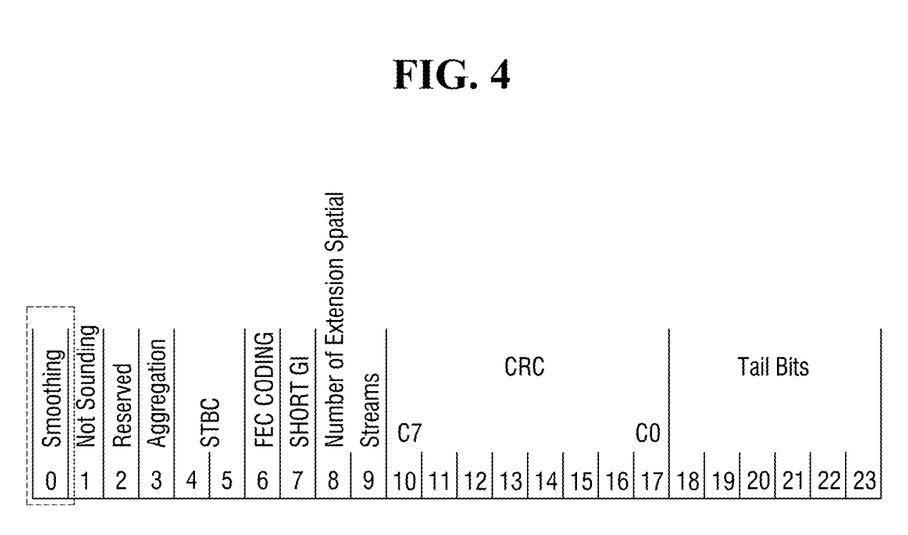
FIG. 4 is an exemplary diagram showing a preamble of IEEE 802.11n.

FIG. 4 is an exemplary diagram showing a preamble of IEEE 802.11n. FIG. 5 is an exemplary diagram showing a preamble of IEEE 802.11ac.

Referring to FIGS. 1 and 4, the description includes the beam transmitting device 100 being, for example, implemented according to some embodiments is an IEEE 802.11n system.

The preamble of IEEE 802.11n may include a smoothing field, as shown in FIG. 4. The controller 110 may turn on the smoothing field in the preamble to allow the beam receiving device 200 to perform a smoothing operation on a signal received from the beam transmitting device 100. Here, "turn on" may mean including one or more asserted bits in the field.

Alternatively, the controller 110 may turn off the smoothing field in the preamble not to allow the beam receiving device 200 to perform a smoothing operation on a signal received from the beam transmitting device 100. Here, "turn off" may mean including one or more non-asserted bits in the field.

As described above, when the beam receiving device 200 performs the smoothing operation on the beamforming vector $V_k$ including discontinuity, recovery accuracy of data transmitted from the beam transmitting device 100 may be lowered.

Accordingly, when beamforming has been performed in the beam transmitting device 100, in order to increase the data recovery accuracy, the controller 110 may turn off the smoothing field in the preamble not to allow the beam receiving device 200 to perform the smoothing operation. Since the beamforming vector $V_k$ generated by beamforming includes discontinuity, when the beam receiving device 200 performs the smoothing operation thereon, the data recovery accuracy may be extremely lowered. Therefore, it is not allowed for the beam receiving device 200 to perform the smoothing operation. The receiving device 200 recovers the smoothing field and performs or does not perform the smoothing operation depending on whether the smoothing field is turned on or off, respectively.

However, when the smoothing operation is not performed, the beam receiving device 200 may not reduce noise in the received NDP. Thus, the performance of the entire beam transmission system may be deteriorated.

Accordingly, by removing the discontinuity of the beamforming vector $V_k$ through smoothing in the beam transmitting device 100 according to some embodiments, even though the beam transmitting device 100 performs the beamforming and the beam receiving device 200 performs the smoothing operation, it is possible to improve the performance of the entire beam transmission system. That is, when the discontinuity of the beamforming vector $V_k$ has been removed through smoothing in the beam transmitting device 100 according to some embodiments, the controller 110 turns on the smoothing field in the preamble to allow the beam receiving device 200 to perform a smoothing operation.

Figure 5:
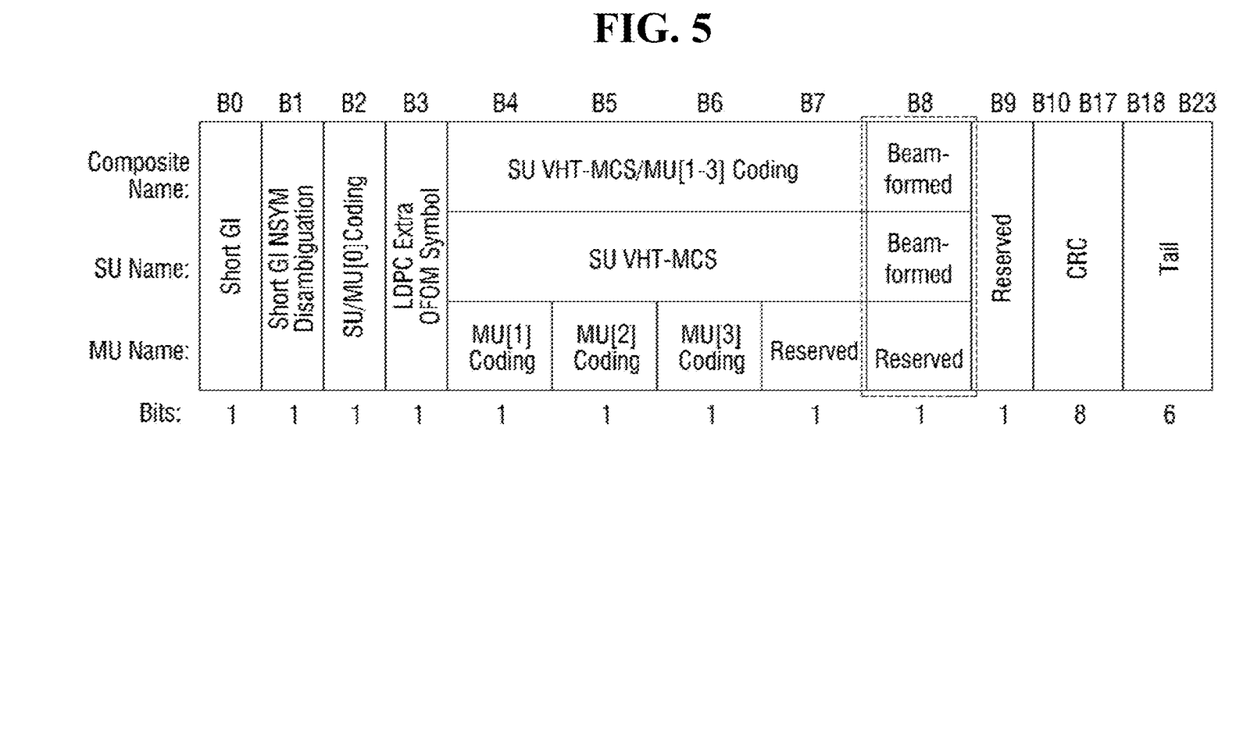
FIG. 5 is an exemplary diagram showing a preamble of IEEE 802.11ac.

Referring to FIGS. 1 and 5, a description will be made on the assumption that the beam transmission system including the beam transmitting device 100 according to some embodiments is an IEEE 802.11ac system.

A preamble of IEEE 802.11ac may include a beamformed field, as shown in FIG. 5. The controller 110 may turn off the beamformed field in the preamble to allow the beam receiving device 200 to perform a smoothing operation on a signal received from the beam transmitting device 100.

Alternatively, the controller 110 may turn on the beamformed field in the preamble not to allow the beam receiving device 200 to perform a smoothing operation on a signal received from the beam transmitting device 100.

As described above, when the beam receiving device 200 performs the smoothing operation on the beamforming vector $V_k$ including discontinuity, recovery accuracy of data transmitted from the beam transmitting device 100 may be lowered.

Accordingly, when beamforming has been performed in the beam transmitting device 100, in order to increase the data recovery accuracy, the controller 110 may turn on the beamformed field in the preamble not to allow the beam receiving device 200 to perform the smoothing operation. Since the beamforming vector $V_k$ generated by beamforming includes discontinuity, when the beam receiving device 200 performs the smoothing operation thereon, the data recovery accuracy may be extremely lowered. Therefore, it is not allowed for the beam receiving device 200 to perform the smoothing operation.

However, when the smoothing operation is not performed, the beam receiving device 200 cannot obtain a smooth curved channel. Thus, the performance of the entire beam transmission system may be deteriorated.

Accordingly, by removing the discontinuity of the beamforming vector $V_k$ through smoothing in the beam transmitting device 100 according to some embodiments, even though the beam transmitting device 100 performs the beamforming and the beam receiving device 200 performs the smoothing operation, it is possible to improve the performance of the entire beam transmission system. That is, when the discontinuity of the beamforming vector $V_k$ has been removed through smoothing in the beam transmitting device 100 according to some embodiments, the controller 110 turns off the beamformed field in the preamble to allow the beam receiving device 200 to perform a smoothing operation.

The above description is not limited to the systems of IEEE 802.11n and IEEE 802.11ac, and may be applied to a system of, e.g., IEEE 802.11ax.

Referring back to FIG. 1, the beamformer 120 may generate beamforming vectors $V_k$ for subcarriers. Specifically, the beamformer 120 may generate beamforming vectors $V_k$ for all subcarriers based on channel information on subcarriers inferred by the interpolator 130 to be described later. The beamforming vector $V_k$ may include discontinuity before a smoothing operation is performed in the smoothing circuit 140. The beamformer 120 receives, from the beam receiving device 200, channel information generated from the beamforming vector $V_k$ including discontinuity, and regenerates a beamforming vector $V_k$ smoothed by the smoothing circuit 140.

The beamformer 120 may generate, as shown in the following Eq. 4, a beamforming vector $V_k$ based on quantized channel information $\{\phi_{ij}, \psi_{ij}\}_k$ fed back from the beam receiving device 200.

$$V_k = \left[ \prod_{i=1}^{min(N_{ss},N_{tx}-1)} \left[ D_i(1_{i-1}, e^{j\phi_{i,i}}, \ldots, e^{j\phi_{N_r-1,i}}, 1) \prod_{l=i+1}^{N_{tx}} G_{li}^T(\psi_{li}) \right] \right] \check{I}_{Ntx \times Nss} \quad \text{Eq. 4}$$

In Eq. 4, $1_{i-1}$ is a vector consisting of 1 and having a length of i−1. $\check{I}_{Ntx \times Nss}$ is an identity matrix having a size of Ntx×Nss. The matrices G( ) are Givens rotation matrices.

In Eq. 4, $D_i(1_{i-1}, e^{j\phi_{i,i}}, \ldots, e^{j\phi_{r-1,i}}, 1)$ may be represented by a diagonal matrix as shown in the following Eq. 5:

$$D_i(1_{i-1}, e^{j\phi_{i,i}}, \ldots, e^{j\phi_{N_{tx}-1,i}}, 1) = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_{tx}-1,i}} & 0 \\ 0 & 0 & 0 & 0 & 1 \end{bmatrix} \quad \text{Eq. 5}$$

In Eq. 4, $G_{li}(\psi)$ may be expressed as in the following Eq. 6:

$$G_{li}(\psi) = \begin{bmatrix} I_{i-1} & 0 & 0 & \ldots & 0 \\ 0 & \cos(\psi) & 0 & \sin(\psi) & 0 \\ 0 & 0 & I_{l-i-l} & 0 & 0 \\ 0 & -\sin(\psi) & 0 & \cos(\psi) & 0 \\ 0 & 0 & 0 & 0 & I_{N_{tx}-1} \end{bmatrix} \quad \text{Eq. 6}$$

As described above in conjunction with the compression circuit 230, the interpolator 130 may apply an interpolation to channel information on received subcarriers in order to infer channel information on subcarriers that has not been received.

The interpolator 130 according to some embodiments may use either an angle interpolation or a Q-matrix interpolation. The type of interpolation may not be limited thereto.

The interpolator 130 according to some embodiments interpolates $\{\phi_{ij}, \psi_{ij}\}_k$ (k=1, 2, ..., $N_{feedback}$) included in the channel information, delivered from the beam receiving device 200 to the beam transmitting device 100, in the angular domain using the angle interpolation.

The $N_{feedback}$ ($N_{feedback} \leq N_{FFT}$) is the number of subcarriers delivered from the beam receiving device 200 to the beam transmitting device 100, and may be determined based on the above-described number $N_g$ of grouped subcarriers. An operation of the interpolator 130 performing the angle interpolation will be described with reference to FIG. 6 below.

Figure 6:
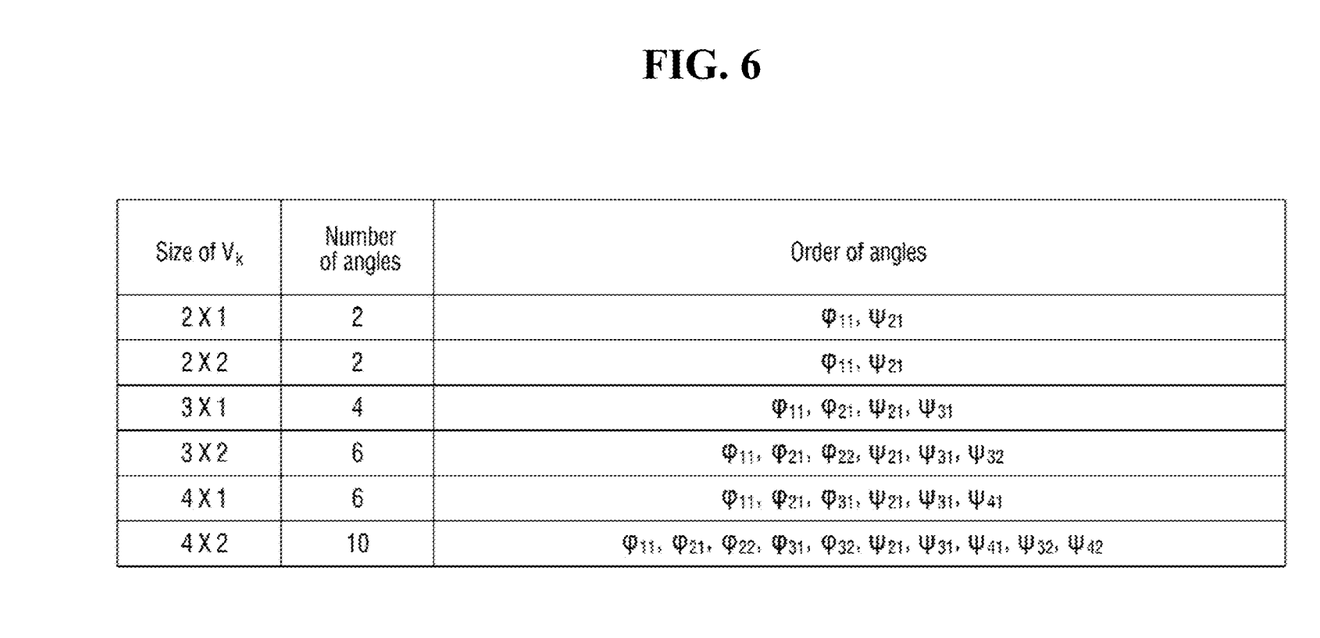
FIG. 6 is an exemplary table showing phases for each subcarrier after feedback according to some embodiments.

FIG. 6 is an exemplary table showing phases for each subcarrier after feedback according to some embodiments.

Referring to FIGS. 1 and 6, the number of $\{\phi_{ij}, \psi_{ij}\}_k$ (k=1, 2, ..., $N_{feedback}$) included in channel information for each subcarrier received from the beam receiving device 200 may be, for example, the same as in the table of FIG. 6. The number of $\{\phi_{ij}, \psi_{ij}\}_k$ (k=1, 2, ..., $N_{feedback}$) included in the channel information for each subcarrier is merely exemplary and is not limited to that illustrated in FIG. 6.

For example, in each of the cases where the number of subcarriers grouped by the compression circuit 230 of the beam receiving device 200 is 2 ($N_g$=2), the number of subcarriers grouped is 4 ($N_g$=4), and the number of subcarriers grouped is 16 ($N_g$=16), the interpolation using Eq. 4 is performed on each angle of $\{\phi_{ij}, \psi_{ij}\}_k$ (k=1, 2, ..., $N_{feedback}$) to infer channel information for all subcarriers (i.e., $N_{FFT}$).

Referring back to FIG. 1, the interpolator 130 according to some embodiments may perform the Q matrix interpolation. The interpolator 130 may generate $\hat{V}_k$ (k=0, 1, ..., $N_{feedback}$−1) by using Eq. 4 for $\{\phi_{ij}, \psi_{ij}\}_k$ (k=0, 1, ..., $N_{feedback}$−1) included in the channel information received from the beam receiving device 200. The generated $\hat{V}_k$ may be referred to as a Q matrix. For example, in each of the cases where the number of subcarriers grouped by the compression circuit 230 of the beam receiving device 200 is 2 ($N_g$=2), the number of subcarriers grouped is 4 ($N_g$=4), and the number of subcarriers grouped is 16 ($N_g$=16), the interpolator 130 may perform the Q matrix interpolation on $\hat{V}_k$ having a size of Ntx×Nss, which consists of a complex number.

As described above, the interpolator 130 according to some embodiments may perform at least one of the angle interpolation or the Q matrix interpolation method, and after performing the above-described interpolation, may generate channel information on all subcarriers (k=0,1, ..., $N_{FFT}$).

The beam transmitting device 100 may obtain the channel information for all subcarriers using the interpolator 130 and then smooth the beamforming vector $V_K$ using the smoothing circuit 140.

Hereinafter, a method of smoothing the beamforming vector $V_k$ by the smoothing circuit 140 will be described in detail with reference to FIG. 7.

Figure 7:
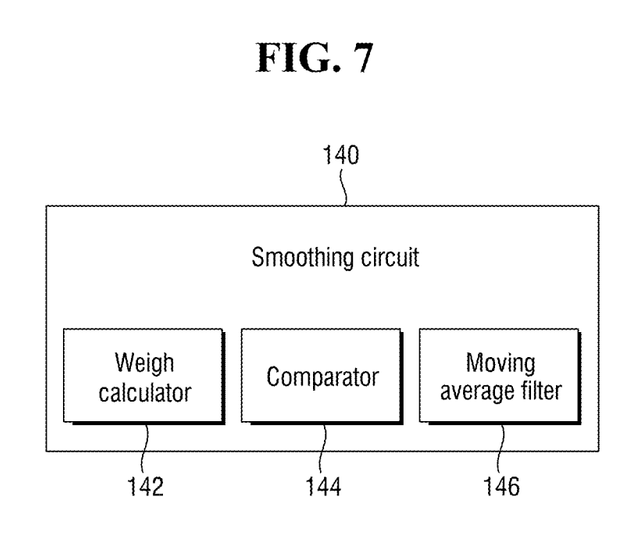
FIG. 7 is an exemplary diagram illustrating the smoothing circuit according to some embodiments.

FIG. 7 is an exemplary diagram illustrating the smoothing circuit according to some embodiments.

Referring to FIGS. 1 and 7, the smoothing circuit 140 may include a weight calculator 142, a comparator 144, and a moving average filter 146. The configuration of the smoothing circuit 140 may not be limited thereto.

Based on the channel information for all subcarriers interpolated by the interpolator 130, the weight calculator 142 may calculate a weight for each beamforming vector $V_k$ by using the beamforming vectors $V_k$ for all subcarriers generated by the beamformer 120. More specifically, the weight calculator 142 uses beamforming vectors (e.g., $V_{k-1}$ and $V_k$) of two adjacent subcarriers to calculate a weight to be applied to each beamforming vector so as to reduce discontinuity between the beamforming vectors (e.g., $V_{k-1}$ and $V_k$) of the two adjacent subcarriers.

In order to calculate the weight, the weight calculator 142 according to some embodiments may use a geometric distance (Euclidean distance) between beamforming vectors (e.g., $V_{k-1}$ and $V_k$) of two adjacent subcarriers, obtained by the following Eq. 7:

$$EDis = \|V_{i-1} - \widehat{V_i}\| \quad \text{Eq. 7}$$

In Eq. 7, |•| is a norm operator. In addition, $V_k = [v_{1,k}, v_{2,k}, \ldots, v_{Nss,k}]$. Subsequently, the weight calculator 142 calculates, using Eq. 8 below, a common phase factor at which the geometric distance between beamforming vectors (e.g., $V_{k-1}$ and $V_k$) of the adjacent subcarriers becomes minimum.

$$\phi_i^* = \text{minimize}_\phi \|\widehat{v_{i,k-1}} - e^{j\phi} v_{i,k}\|, \, i=1,2, \ldots, N_{ss} \quad \text{Eq. 8}$$

An effect of the common phase factor is to apply similar rotations to streams created by the SVD compensation of the channel. With streams arriving at the receiver with similar phase, noise terms from what stream to the other by way of imaginary parts can be reduced.

In Eq. 8, a vector (e.g., $k-1^{th}$ subcarrier) with a hat (ˆ) is a vector whose common phase is compensated. The above-mentioned common phase compensation may be performed sequentially for all subcarriers ($k=0, 1, \ldots, N_{FFT}$). Here, when compensating for the common phase with respect to a $k^{th}$ subcarrier, since a $k-1^{th}$ subcarrier to which the common phase compensation has already been applied is used, a hat (ˆ) is indicated in a $k-1^{th}$ subcarrier vector as shown in Eq. 8. $\varnothing_i^*$ in Eq. 8 may be expressed as Eq. 9:

$$e^{j\varnothing_i^*} = \frac{v_{i,k}^h \bar{v}_{i,k-1}}{|v_{i,k}^h \bar{v}_{i,k-1}|} \qquad \text{Eq. 9}$$

Therefore, for example, with respect to $V_{k-1}$, $V_k$ for minimizing the geometric distance is expressed as Eq. 10:

$$\check{V}_k = V_k \begin{bmatrix} e^{j\varnothing_i^*} & \cdots & 0 \\ \vdots & \ddots & \vdots \\ 0 & \cdots & e^{j\varnothing_{Nss}^*} \end{bmatrix} \equiv V_k W \qquad \text{Eq. 10}$$

In Eq. 10, the weight W is a diagonal matrix. In the example of Eq. 10, all of the weights have the same magnitude, 1, and differ only in phase.

In order to calculate the weight, another weight calculator 142 according to some embodiments may use a cross correlation between beamforming vectors (e.g., $V_{k-1}$ and $V_k$) of two adjacent subcarriers, obtained by the following Eq. 11:

$$\text{XCor} = \text{Re}(V_{i-1}^h \hat{V}_i) \qquad \text{Eq. 11}$$

In Eq. 11, Re(•) may represent only a real value of a complex number. Subsequently, the weight calculator 142 calculates, using Eq. 12 below, a common phase factor at which the geometric distance between beamforming vectors (e.g., $V_{k-1}$ and $V_k$) of the adjacent subcarriers (e.g., $V_{k-1}$ and $V_k$) becomes maximum.

$$\varnothing_i^* = \text{maximize}_\varnothing \text{Re}(\overline{v_{i,k-1}^h} e^{j\varnothing} v_{i,k}), i=1,2,\ldots,N_{ss} \qquad \text{Eq. 12}$$

$\varnothing_i^*$ in Eq. 12 may be expressed as Eq. 9 described above. Therefore, for example, with respect to $V_{k-1}$, $V_k$ for maximizing the cross correlation is expressed as Eq. 10 described above.

The comparator 144 may determine whether or not to apply the weight W calculated by the weight calculator 142 to each subcarrier.

In more detail, when a geometric distance of Eq. 7 of a subcarrier calculated by the weight calculator 142 exceeds a threshold, the comparator 144 according to some embodiments may allow the weight calculator 142 to calculate and apply a weight for a beamforming vector of the corresponding subcarrier. If the comparator 144 determines that a geometric distance of Eq. 7 of a subcarrier calculated by the weight calculator 142 is less than or equal to a threshold, the comparator 144 may prevent the weight calculator 142 from calculating and applying a weight for a beamforming vector of the corresponding subcarrier.

When a cross correlation of Eq. 11 of a subcarrier calculated by the weight calculator 142 is less than a threshold, another comparator 144 according to some embodiments may allow the weight calculator 142 to calculate and apply a weight for a beamforming vector of the corresponding subcarrier. In general the threshold used to evaluate distance is different than the threshold used to evaluate cross correlation. If the comparator 144 determines that a cross correlation of Eq. 11 of a subcarrier calculated by the weight calculator 142 is greater than or equal to a threshold, the comparator 144 may prevent the weight calculator 142 from calculating and applying a weight for a beamforming vector of the corresponding subcarrier.

The moving average filter 146 obtains, as shown in the following Eq. 13, a moving average by using beamforming vectors $\check{V}_k$ to which L weights generated by the weight calculator 142 and the comparator 144 have been applied.

$$V_{smooth,k} = \frac{1}{L}\sum_{i=0}^{L-1} \check{V}_{k-i} \qquad \text{Eq. 13}$$

The moving average used by the moving average filter 146 is obtained by an averaging method that continuously calculates an average of beamforming vectors $\check{V}_k$ to which two or more successive weights have been applied. A type of the moving average used by the moving average filter 146 is not limited to the above-described Eq. 13 and the moving average may be calculated using a weight $\alpha_i$ as in the following Eq. 14:

$$V_{smooth,k} = \frac{1}{L}\sum_{i=0}^{L-1} a_i \check{V}_{k-i} \qquad \text{Eq. 14}$$

In Eq. 14, $\Sigma_{i=0}^{L-1} a_i = L$. A moving average length L or the number L of weighted beamforming vectors $\check{V}_k$ used by the moving average filter 146 may be adjusted depending on whether the weight calculator 142 according to some embodiments calculates the common phase factor using distance or calculates the common phase factor using the cross correlation.

A beamforming vector $V_{smooth,k}$ smoothed through the weight calculator 142, the comparator 144, and the moving average filter 146 of the smoothing circuit 140 may not include discontinuity which was included in a beamforming vector before being smoothed.

Accordingly, the beam receiving device 200 may accurately recover data even though it smooths a beamformed signal received from the beam transmitting device 100.

That is, after the beamformer 120 of the beam transmitting device 100 generates a beamforming vector, the controller 110 according to some embodiments may adjust a preamble so that the beam receiving device 200 smooths a signal received from the beam transmitting device 100.

As one example, after the beamformer 120 generates a beamforming vector, the controller 110 according to some embodiments may adjust a preamble so that the beam receiving device 200 smooths a signal received from the beam transmitting device 100, by turning on a smoothing field of the preamble according to the IEEE802.11n system.

As another example, after the beamformer 120 generates a beamforming vector, the controller 110 according to some embodiments may adjust a preamble so that the beam receiving device 200 smooths a signal received from the beam transmitting device 100, by turning off a beamformed field of the preamble according to the IEEE802.11ac system.

As described above, the beam transmitting device 100 according to some embodiments may transmit a null data packet NDP to the beam receiving device 200 and receive, from the beam receiving device 200, channel information generated from the null data packet NDP. Thereafter, the beam transmitting device 100 smooths a beamforming vector using the smoothing circuit 140, and the beam receiving device 200 may perform a smoothing operation for a data packet including the smoothed beamforming vector. That is, the beam transmission system including the beam transmitting device 100 according to some embodiments not only uses a beamforming vector of the beam transmitting device 100 but also performs a smoothing operation in the beam receiving device 200, thereby improving the operation performance of the entire beam transmission system.

Hereinafter, an operating method of the beam transmitting device according to some embodiments will be described. For simplicity of description, a description overlapping with the above description is omitted.

Figure 8:
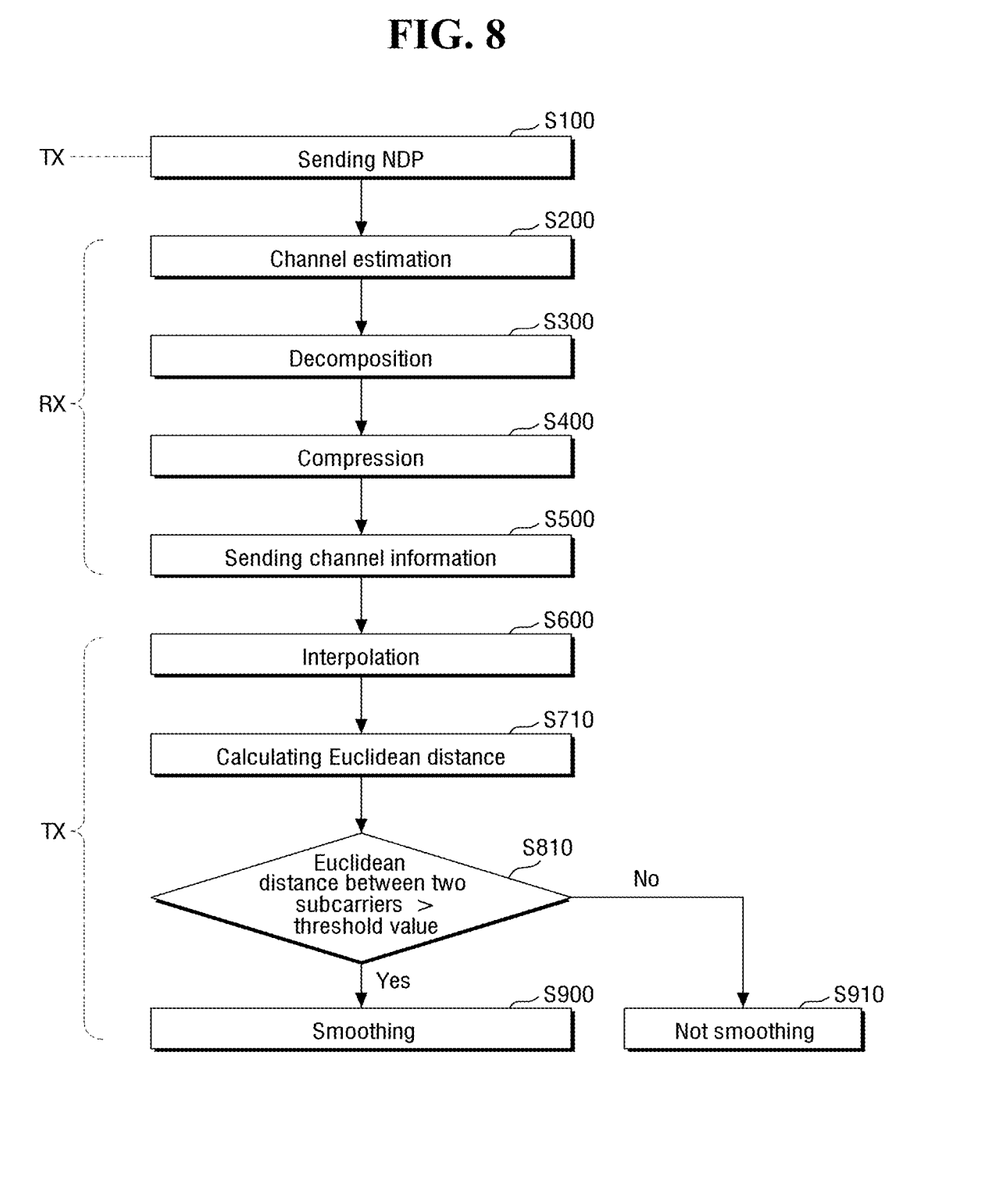
FIG. 8 is an exemplary flowchart describing an operating method of the beam transmitting device according to some embodiments.

FIG. 8 is an exemplary flowchart describing an operating method of the beam transmitting device according to some embodiments. Referring to FIGS. 1, 7 and 8, first, a transmitting end TX (e.g., the beam transmitting device 100) transmits a null data packet NDP (also referred to as a sounding packet) to a receiving end RX (e.g., the beam receiving device 200) (step S100).

The beam receiving device 200 estimates, using the channel estimation circuit 210, a channel based on a reference signal included in the null data packet NDP received from the beam transmitting device 100 (step S200). Thereafter, the decomposition circuit 220 decomposes the channel (step S300). The compression circuit 230 groups and compresses subcarriers using a singular value decomposed by the decomposition circuit 220 (step S400). For example, when the number of subcarriers grouped is 1 ($N_g=1$), channel information for all subcarriers is transmitted from the beam receiving device 200 to the beam transmitting device 100. In each of the cases where the number of subcarriers grouped is 2 ($N_g=2$), the number of subcarriers grouped is 4 ($N_g=4$), and the number of subcarriers grouped is 16 ($N_g=16$), channel information for only one representative subcarrier in a group formed by 2, 4, or 16 subcarriers among all subcarriers may be transmitted from the beam receiving device 200 to the beam transmitting device 100 (step S500).

The interpolator 130 of the transmitting end TX (e.g., the beam transmitting device 100) applies an interpolation to subcarriers received from the receiving end RX (e.g., the beam receiving device 200) (step S600).

For example, when the number of subcarriers grouped in the compression circuit 230 is 2 ($N_g=2$), when the number of subcarriers grouped is 4 ($N_g=4$), and when the number of subcarriers grouped is 16 ($N_g=16$), channel information for only some subcarriers is transmitted from the receiving end RX (e.g., the beam receiving device 200) to the transmitting end TX (e.g., the beam transmitting device 100). Therefore, for subcarriers having no channel information, inference through an interpolation of the interpolator 130 may be required. The interpolator 130 according to some embodiments may use either an angle interpolation or a Q-matrix interpolation. A type of the interpolation may not be limited thereto.

Referring again to FIG. 8, the weight calculator 142 calculates a geometric distance for subcarriers interpolated by the interpolator 130 (step S710). Specifically, a geometric distance (Euclidean distance) between beamforming vectors (e.g., $V_{k-1}$ and $V_k$) of two adjacent subcarriers is obtained, and a weight is calculated. This is the same as the description of the weight calculator 142 described above with reference to FIG. 1, and thus a description thereof will be omitted.

Subsequently, it is determined whether the geometric distance of the subcarriers calculated by the weight calculator 142 exceeds a threshold (step S810). If the geometric distance exceeds the threshold (Yes in step S810), the weight for the beamforming vectors of the corresponding subcarriers is applied by the weight calculator 142, and a moving average for the beamforming vectors to which the weight has been applied is obtained by the moving average filter 146, thereby performing a smoothing operation on the beamforming vectors (step S900).

Otherwise, if the geometric distance is less than or equal to the threshold (No in step S810), the smoothing operation is not performed on the beamforming vectors of the corresponding subcarriers (step S910).

Figure 9:
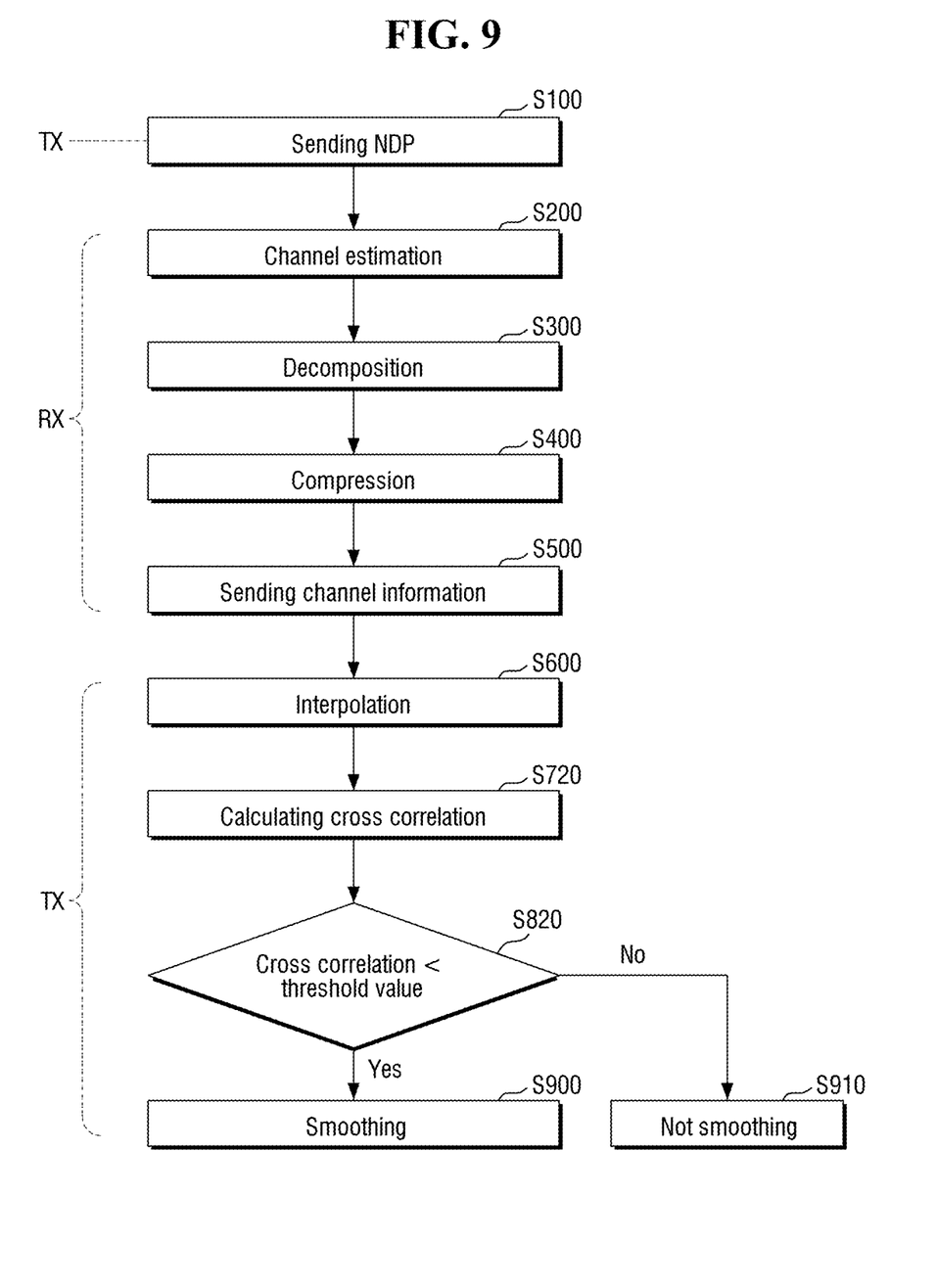
FIG. 9 is an exemplary flowchart describing an operation method of another beam transmitting device according to some embodiments.

FIG. 9 is an exemplary flowchart describing an operation method of another beam transmitting device according to some embodiments.

Referring to FIG. 9, a description of steps S100 to S600 overlaps with the description of FIG. 8, and thus a description thereof will be omitted.

The weight calculator 142 calculates a cross correlation for subcarriers interpolated by the interpolator 130 (step S720). Specifically, a cross correlation between beamforming vectors (e.g., $V_{k-1}$ and $V_k$) of two adjacent subcarriers is obtained, and a weight is calculated. This is the same as the description of the weight calculator 142 described above with reference to FIG. 1, and thus a description thereof will be omitted.

Subsequently, it is determined whether the cross correlation of the subcarriers calculated by the weight calculator 142 is less than a threshold (step S820). If the cross correlation is less than the threshold (Yes in step S820), the weight for the beamforming vectors of the corresponding subcarriers is applied by the weight calculator 142, and a moving average for the beamforming vectors to which the weight has been applied is obtained by the moving average filter 146, thereby performing a smoothing operation on the beamforming vectors (step S900).

Otherwise, if the cross correlation is greater than or equal to the threshold (No), the smoothing operation is not performed on the beamforming vectors of the corresponding subcarriers (step S910).

At least one of the components, elements, modules or units (collectively "components" in this paragraph) represented by a block in the drawings, e.g., the controller 110 in FIG. 1 and the comparator 144 in FIG. 7, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components.

In concluding the detailed description, those skilled in the art will appreciate that many variations and modifications may be made to the preferred embodiments without substantially departing from the principles of this disclosure. Therefore, the disclosed embodiments are used in a generic and descriptive sense only and not for purposes of limitation.

What is claimed is:

1. A beam transmitting device comprising:
   a controller configured to:
      transmit a null data packet (NDP), and
      receive channel information; and
   a smoothing circuit configured to smooth a plurality of beamforming vectors in the received channel information,
   wherein the smoothing circuit comprises:
      a weight calculator configured to calculate a common phase factor using two adjacent beamforming vectors among the plurality of beamforming vectors, and
      a moving average filter configured to perform the smoothing using the common phase factor,
   wherein the controller is further configured to transmit a waveform based on the smoothed plurality of beamforming vectors, a preamble and data.

2. The beam transmitting device of claim 1, wherein the moving average filter is further configured to smooth the plurality of beamforming vectors by computing a moving average using the common phase factor.

3. The beam transmitting device of claim 1, wherein the weight calculator is further configured to:
   calculate a geometric distance between the two adjacent beamforming vectors, and
   calculate the common phase factor at which the geometric distance becomes a minimum.

4. The beam transmitting device of claim 3, wherein the smoothing circuit includes a comparator configured to compare the geometric distance with a threshold, wherein the smoothing circuit is further configured to perform the smoothing when the geometric distance exceeds the threshold.

5. The beam transmitting device of claim 1, wherein the weight calculator is further configured to:
   calculate a cross correlation between the two adjacent beamforming vectors, and
   calculate the common phase factor at which the cross correlation becomes a maximum.

6. The beam transmitting device of claim 5, wherein the smoothing circuit comprises a comparator configured to compare the cross correlation with a threshold, wherein the smoothing circuit is further configured to perform the smoothing when the cross correlation is less than the threshold.

7. The beam transmitting device of claim 1, wherein the controller is further configured to turn on a smoothing field of the preamble, and
   wherein an external device having received the waveform performs a second smoothing on the waveform.

8. The beam transmitting device of claim 1, wherein the controller is further configured to turn off a beamformed field of the preamble, and
   wherein an external device having received the waveform performs a second smoothing on the waveform.

9. An operating method of a beam transmitting device, the operating method comprising:
   transmitting, by the beam transmitting device, a null data packet;
   receiving, by the beam transmitting device, channel information, wherein the channel information is sent by a beam receiving device after a reception of the null data packet;
   obtaining, based on an interpolation of the channel information, a plurality of beamforming vectors;
   calculating, by a weight calculator, a common phase factor using the plurality of beamforming vectors;
   obtaining a weighted plurality of beamforming vectors by the weight calculator by applying the common phase factor to the plurality of beamforming vectors;
   calculating, by a moving average filter, a moving average of the weighted plurality of beamforming vectors; and
   transmitting a waveform based on the moving average of the weighted plurality of beamforming vectors, a preamble and data.

10. The operating method of claim 9, wherein the calculating the common phase factor comprises calculating the common phase factor to minimize a geometric distance between two adjacent beamforming vectors among the plurality of beamforming vectors.

11. The operating method of claim 10, wherein the smoothing comprises:
   comparing, by a comparator, the geometric distance with a threshold; and
   performing the smoothing when the geometric distance exceeds the threshold.

12. The operating method of claim 9, wherein the calculating the common phase factor comprises calculating the common phase factor to maximize a cross correlation between two adjacent beamforming vectors among the plurality of beamforming vectors.

13. The operating method of claim 12, wherein the smoothing comprises:
   comparing, by a comparator, the cross correlation with a threshold; and
   performing the smoothing only when the cross correlation is less than the threshold.

14. The operating method of claim 9, further comprising:
   turning on, by the beam transmitting device, a smoothing field of the preamble to allow the beam receiving device to perform smoothing on a received version of the waveform.

15. The operating method of claim 9, further comprising:
   turning off, by the beam transmitting device, a beamformed field of the preamble to allow the beam receiving device to perform smoothing on a received version of the waveform.

16. A beam transmitting device comprising:
   a beamformer configured to form a beam;
   a transmitter configured to transmit, using the beam, a null data packet;
   a controller configured to control a preamble in the null data packet;
   an interpolator configured to:
      interpolate channel information, wherein the channel information is sent by a beam receiving device after a reception of the null data packet, and
      obtain, based on the interpolated channel information, a plurality of beamforming vectors; and a smoothing circuit configured to smooth the plurality of beamforming vectors, wherein the smoothing circuit includes:

a weight calculator configured to obtain a weighted plurality of beamforming vectors based on a common phase factor;

a comparator configured to compare a value with a threshold to determine whether to perform smoothing, the value derived using two adjacent beamforming vectors among the plurality of beamforming vectors; and a moving average filter configured to smooth by forming a moving average using the common phase factor based on an output of the comparator.

17. The beam transmitting device of claim 16, wherein the weight calculator is configured to:

calculate a geometric distance between the two adjacent beamforming vectors, and calculate the common phase factor at which the geometric distance becomes a minimum.

18. The beam transmitting device of claim 17, wherein the comparator is further configured to compare the geometric distance with a first threshold to produce the output of the comparator indicating to perform the smoothing when the geometric distance exceeds the first threshold.

19. The beam transmitting device of claim 18, wherein the weight calculator is further configured to:

calculate a cross correlation between the two adjacent beamforming vectors, and calculate the common phase factor at which the cross correlation becomes a maximum.

20. The beam transmitting device of claim 19, wherein the comparator is further configured to compare the cross correlation with a second threshold to produce the output of the comparator indicating to perform the smoothing when the cross correlation is less than the second threshold.

* * * * *